US012474472B2

(12) United States Patent
Rathod et al.

(10) Patent No.: US 12,474,472 B2
(45) Date of Patent: Nov. 18, 2025

(54) ELECTROMAGNETIC TRANSMISSION LINE SENSORS

(71) Applicant: B/E Aerospace, Inc., Winston-Salem, NC (US)

(72) Inventors: Vivek T. Rathod, Mukilteo, WA (US); Adwait A. Trikanad, Hillsboro, OR (US); Sanjay G. Bajekal, Bothell, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 121 days.

(21) Appl. No.: 18/238,795

(22) Filed: Aug. 28, 2023

(65) Prior Publication Data

US 2025/0076500 A1 Mar. 6, 2025

(51) Int. Cl.
*G08B 23/00* (2006.01)
*G01S 7/48* (2006.01)
(Continued)

(52) U.S. Cl.
CPC ............ *G01S 17/04* (2020.01); *G01S 7/4802* (2013.01); *G01S 7/4811* (2013.01)

(58) Field of Classification Search
CPC ....... G01S 17/04; G01S 7/4802; G01S 7/4811
See application file for complete search history.

(56) References Cited

U.S. PATENT DOCUMENTS 5,914,610 A * 6/1999 Gershenfeld ........ B60N 2/0035
340/870.37

7,109,726 B2 * 9/2006 van Berkel ............ G01V 3/088
324/687
(Continued)

FOREIGN PATENT DOCUMENTS

AT E83067 T1 12/1992
GB 2598941 A 3/2022
(Continued)

OTHER PUBLICATIONS

Davide W. Greve, et al, "Investigation of Goubau Wave Propagation on Large Pipes for Sensing Applications" Sensors 2023, 23, 4991 (published May 23, 2023) https://doi.org.10.3390/s23114991.
(Continued)

*Primary Examiner* — Toan N Pham
(74) *Attorney, Agent, or Firm* — Suiter Swantz IP

(57) ABSTRACT

A system may include a transmitter and receiver. The system may include an electromagnetic transmission line sensor configured as a passive sensor, configured to determine at least one of a presence of one or more objects or one or more additional sensing parameters, wherein the electromagnetic transmission line sensor is configured as a continuous sensor, wherein the electromagnetic transmission line sensor includes a first port; a second port, wherein one of the first port or the second port comprises the transmitter and another of the first port or the second port comprises the receiver; and a length of waveguide suitable for transmitting an electromagnetic wave, wherein the length of waveguide is configured to couple to auxiliary sensors, wherein the transmitter transmits a packet comprising the electromagnetic wave through the length of waveguide to the receiver, wherein the one or more processing elements of the receiver interprets the packet.

17 Claims, 10 Drawing Sheets

(51) Int. Cl.
    *G01S 7/481* (2006.01)
    *G01S 17/04* (2020.01)

(56) References Cited

U.S. PATENT DOCUMENTS

| | | |
|---|---|---|
| 8,159,385 B2 | 4/2012 | Farneth et al. |
| 8,482,434 B2 | 7/2013 | Bajekal et al. |
| 8,810,265 B2 | 8/2014 | Shan et al. |
| 10,101,288 B2 | 10/2018 | Carr |
| 10,181,647 B2 | 1/2019 | Werner et al. |
| 10,198,100 B2 * | 2/2019 | Kaltner .................. G06F 3/044 |
| 10,531,232 B2 | 1/2020 | Bennett et al. |
| 10,690,609 B2 | 6/2020 | Carr |
| 10,812,123 B1 * | 10/2020 | Bennett ..................... H01P 3/10 |
| 2018/0167773 A1 | 6/2018 | Bennett et al. |

FOREIGN PATENT DOCUMENTS

| | | |
|---|---|---|
| KR | 20160060292 A | 5/2016 |
| WO | 2018140843 A1 | 8/2018 |

OTHER PUBLICATIONS

J. Wang, et al.; "Sensing Finger Input Using an RFID Transmission Line," in SenSys '20, Nov. 16-19, 2020; Virtual Event, Japan.

Y. Shibuya "Electromagnetic Waves in a Parallel-Plate Waveguide" (published Dec. 2012); https://demonstrations.wolfram.com/ElectromagneticWavesInAParallelPlateWaveguide/.

European Search Report received in EP Application No. 24196189.5, Jan. 20, 2025, 7 pages.

* cited by examiner

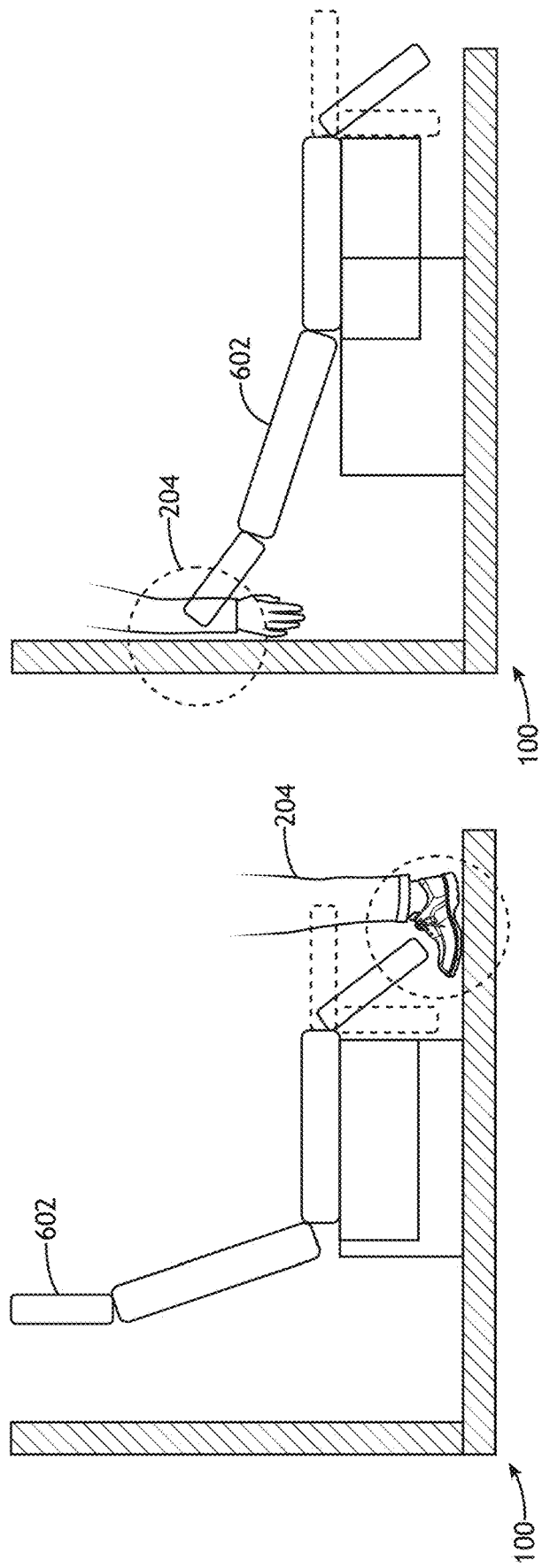

ELECTROMAGNETIC TRANSMISSION LINE SENSORS

FIELD

This disclosure is related broadly to sensor technology, and, more particularly, to electromagnetic sensors.

BACKGROUND

Automated detection of proximity for applications such as object (e.g., obstacles, human and the like) sensing for applications in aviation, health care, surveillance, and the like, have been limited to discrete sensors. However, these discrete sensors only offer a limited coverage of the sensing area. Because there are often multiple critical zones providing a large area for sensing and monitoring, using discrete sensors may be undesirable due to a limited monitorable area associated with each discrete sensor. Further, proximity sensing in the presence of structural features may also require a large number of discrete sensors to be present. However, size (e.g., space), weight, power, and cost (SWaP-C) constrains impose corresponding hardware constraints that may limit the number of discrete sensors that may be implemented. Additionally, cameras may not be used because of privacy concerns. Therefore, it may be desirable to create a sensor that cures the above shortcomings.

SUMMARY

A system is disclosed. In embodiments, the system includes a transmitter. In embodiments, the system includes a receiver, the receiver comprising one or more processing elements. In embodiments, the system includes an electromagnetic transmission line sensor, configured to determine at least one of a presence of one or more objects, or one or more additional sensing parameters, wherein the electromagnetic transmission line sensor is configured as a passive sensor, wherein the electromagnetic transmission line sensor is configured as a continuous sensor. In embodiments, the electromagnetic transmission line sensor includes a first port. In embodiments, the electromagnetic transmission line sensor includes a second port, wherein one of the first port or the second port comprises the transmitter and another of the first port or the second port comprises the receiver. In embodiments, the electromagnetic transmission line sensor includes a length of waveguide disposed between the first port and the second port, wherein the length of waveguide is suitable for transmitting an electromagnetic wave, wherein the length of waveguide is configured to couple to one or more auxiliary sensors, wherein the transmitter transmits a packet comprising the electromagnetic wave through the length of waveguide to the receiver, wherein the one or more processing elements of the receiver interprets the packet to determine the presence of at least one of: a touch event with the one or more objects, a proximity of the one or more objects, a gesture of the one or more objects located in proximity, or the one or more additional sensing parameters.

A system is disclosed. In embodiments, the system includes an interrogator, the interrogator configured to transmit a launched packet comprising an electromagnetic wave and receive one or more reflected packets corresponding to the launched packet. In embodiments, the system includes an electromagnetic transmission line sensor, configured to determine at least one of a presence of one or more objects or one or more additional sensing parameters, wherein the electromagnetic transmission line sensor is configured as a passive sensor, wherein the electromagnetic transmission line sensor is configured as a continuous sensor. In embodiments, the electromagnetic transmission line sensor includes a first port. In embodiments, the electromagnetic transmission line sensor includes a second port, wherein one of the first port or the second port comprises a connection to the interrogator. In embodiments, the electromagnetic transmission line sensor includes a length of waveguide disposed between the first port and the second port, wherein the length of waveguide is suitable for transmitting the electromagnetic wave, wherein the length of waveguide is configured to couple to one or more auxiliary sensors, wherein the interrogator transmits a launched packet through the length of waveguide, wherein the one or more reflected packets are caused by a corresponding one or more of one or more objects, the one or more auxiliary sensors, or another of the first port or the second port, wherein the interrogator interprets the packet to determine the presence of at least one of: a touch event with the one or more objects, a proximity of the one or more objects, a gesture of the one or more objects, a location of the one or more objects, or the one or more additional sensing parameters.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 7A is a side view of the system detecting an object while reclining the foot rest of a seat, in accordance with one or more embodiments of the present disclosure.

FIG. 7B is a side view of the system detecting an object while reclining the back rest of a seat, in accordance with one or more embodiments of the present disclosure.

DETAILED DESCRIPTION

Figure 1B:
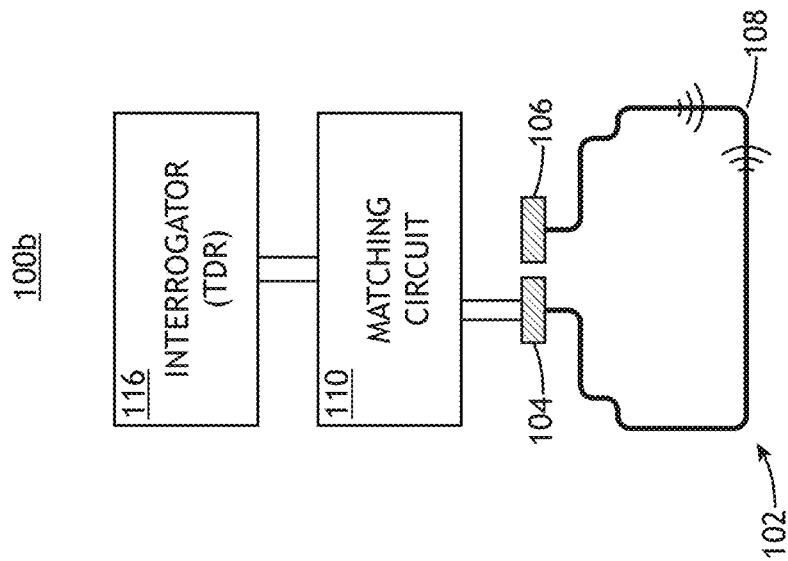
FIG. 1B is a block diagram illustrating a system including an electromagnetic transmission line sensor, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

Broadly speaking, embodiments of the present disclosure are directed to electromagnetic transmission line sensors that may be used for continuous sensing over space. Continuous sensing may greatly increase the sensing area, as compared to the previous solutions incorporating discrete sensors. Further, an electromagnetic transmission line sensor may be configured such that auxiliary sensors (e.g., additional, discrete sensors) may be coupled to the electromagnetic transmission line sensor, thus introducing the possibility of taking additional measurements (e.g., temperature, pressure, stress, strain, or the like) of the sensing area. The auxiliary sensors may change the impedance of the electromagnetic transmission line sensor at a known spatial location. In this way, the auxiliary sensors may be monitored simultaneously with the electromagnetic transmission line sensor. The electromagnetic transmission line sensor may be configured to determine touch events, and/or proximity, and/or gestures (e.g., the time-change of proximity).

The electromagnetic transmission line sensor may be configured such that it is passive and excited by an external source. For example, the electromagnetic transmission line sensor may be configured such that it is excited by a source (e.g., a transmitter or interrogator (e.g., a time domain reflectometer)). The electromagnetic transmission line sensor may be coupled to the source (e.g., either directly or via one or more intervening circuits or electronic components) or excited from afar (e.g., via one or more antennas).

The source may provide the electromagnetic transmission line sensor an electromagnetic wave that the electromagnetic transmission line sensor carries. The frequency and bandwidth of the wave may be controlled by the source. The source may be configured to supply electromagnetic waves of different frequencies and bandwidths based on the environment and application of the electromagnetic transmission line sensor.

The passive nature of the electromagnetic transmission line sensor means that it is free from power requirements, maintenance, and wiring requirements. Further, the electromagnetic transmission line sensor may be free from negative effects of ambient lighting experienced by few wired sensors used for proximity sensing. Conversely, the source may be powered such that the source can provide electromagnetic waves to the electromagnetic transmission line sensor and operate one or more auxiliary sensors.

Electromagnetic induction may be used to monitor large areas, particularly where the system includes a primary circuit coupled to a secondary circuit. Such a configuration is disclosed in U.S. Pat. No. 8,482,434, which is incorporated herein by reference in its entirety. Further, electromagnetic waves may be used to detect touch events without direct coupling or grounding of the conductor. Such a configuration is disclosed in J. Wang, et. Al, "Sensing Finger Input Using an RFID Transmission Line," in *SenSys '20, Virtual Event*, Japan, 2020, which is incorporated herein by reference in its entirety. However, previous configurations lack the ability to detect multiple touch events, proximity, and gesture. The present disclosure describes using guided electromagnetic waves surrounding an electromagnetic transmission line (e.g., an electromagnetic field) to enable the detection of touch events, multiple touch events, proximity, and/or gesture. Additionally, the use of reflectometry is possible in conjunction with the electromagnetic transmission line sensor, as disclosed herein, which may provide distinct wave packets and enable multiple localization or localization zones along the electromagnetic transmission line sensor.

Referring now to FIGS. 1A-8B, various systems 100 and configurations of electromagnetic transmission line sensors 102 are disclosed, in accordance with one or more embodiments of the present disclosure. The systems 100 disclosed in the present application may provide continuous area sensing capabilities using a wireless electromagnetic transmission line sensor 102. This may greatly reduce the burden of monitoring the same area with a collection of discrete sensors, as well as eliminate, or reduce, the need for maintenance and the effects of ambient light or other noise.

Broadly speaking, the present disclosure will discuss three sensing opportunities: touch or touch events, proximity, and gestures. Touch may be defined as contact with the electromagnetic transmission line sensor 102, or a surface within which the electromagnetic transmission line sensor 102 is embedded. Proximity may be defined as an object being within a certain threshold distance (e.g., a predetermined threshold or a selected threshold) (e.g., several millimeter or several inches) of the electromagnetic transmission line sensor 102. Gesture may be defined as the derivative (e.g., time-change) of proximity, and may be approximated by a change in proximity over a predetermined amount of time (e.g., the change in proximity over several milliseconds).

Further, the electromagnetic transmission line sensor 102 of the system 100 may be configured so it may be embedded and/or line the perimeter of various structures (e.g., furniture, floors, partitions ceilings). This may allow the system 100 to identify various objects such as, but not limited to humans (e.g., body parts of humans), laptops, bags, water bottles, and the like. Such detection capabilities may prevent damage to the things sensed by the system 100, as well as the structures the system 100 is embedded in. This sensing may be achieved by transmitting electromagnetic waves or packets (e.g., guided electromagnetic waves) through the electromagnetic transmission line sensor 102 and using the system 100 to detect and interpret changes to the transmitted electromagnetic waves.

It is contemplated that the type of wave (e.g., interface, surface or the like) or waveform (packet) transmitted through the electromagnetic transmission line sensor 102 may be selected, with different types of waves being suitable for fulfilling different functions. Further, the type of wave transmitted may be changed by altering frequency of the wave, material through which transmission occurs, and configuration of the electromagnetic transmission line sensor 102 (e.g., a coaxial line, parallel line, strip line, or the like). The transmitted wave may have any type of waveform, including, but not limited to a continuous wave, a modulated wave, a broadband impulse, or the like.

Figure 1A:
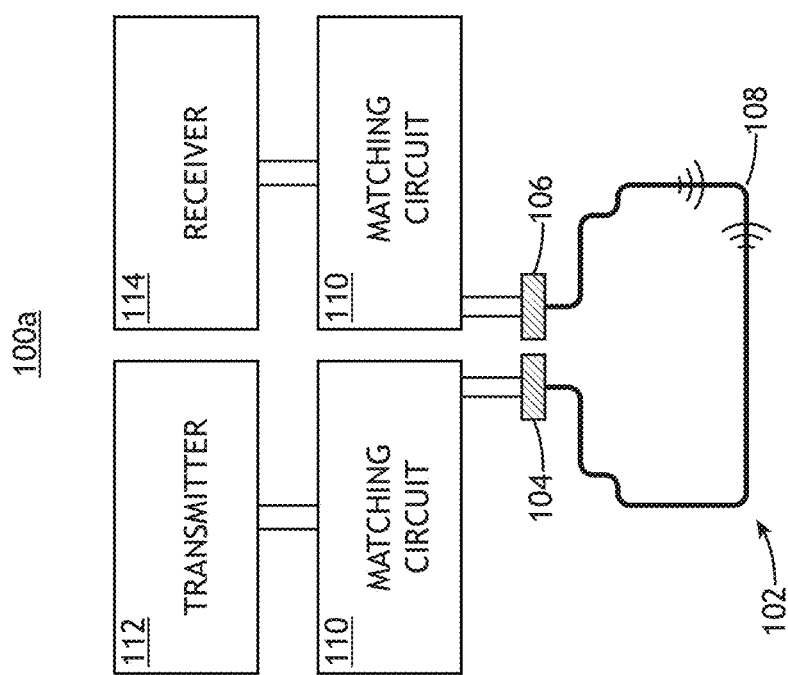
FIG. 1A is a block diagram illustrating a system including an electromagnetic transmission line sensor, in accordance with one or more embodiments of the present disclosure.

FIG. 1A is a block diagram illustrating a system 100a including an electromagnetic transmission line sensor 102, in accordance with one or more embodiments of the present disclosure.

In embodiments, the system 100a includes an electromagnetic transmission line sensor 102. The electromagnetic transmission line sensor 102 may include a first port 104, a second port 106, and a length of conductive material or wave guide 108 disposed between the first port 104 and the second port 106. The electromagnetic transmission line sensor 102 may be configured such that it is wireless and continuous. Thus, the electromagnetic transmission line sensor 102 may not be powered directly. Further, the continuous nature of the electromagnetic transmission line sensor 102 may provide superior sensing capabilities over discrete sensors, as there are no gaps between sensing locations.

In embodiments, the electromagnetic transmission line sensor 102 includes a first port 104. The first port 104 may be located at an end of the electromagnetic transmission line sensor 102 (e.g., an end of the length of waveguide 108). The first port 104 may be configured to couple one or more peripheral devices (e.g., sensors, circuits, other electronics, or the like) to the electromagnetic transmission line sensor 102. Further, the first port 104 may be free or grounded.

In embodiments, the electromagnetic transmission line sensor 102 includes a second port 106. The second port 106 may be located at an end of the electromagnetic transmission line sensor 102 (e.g., an end of the length of waveguide 108). The second port 106 may be configured to couple one or more peripheral devices (e.g., sensors, circuits, other electronics, or the like) to the electromagnetic transmission line sensor 102. Further, the second port 106 may be free or grounded.

In embodiments, the electromagnetic transmission line sensor 102 includes a length of waveguide 108. The length of waveguide 108 may be flexible (e.g., making the electromagnetic transmission line sensor 102 flexible). This may allow the electromagnetic transmission line sensor 102 to be embedded into various utility structures (e.g., seats, bathroom fixtures, kitchen fixtures, or the like) and/or other structures (e.g., walls, floors, tiles, ceilings, frames or the like). Further, the length of waveguide 108 may be of any length, thus allowing the electromagnetic transmission line sensor 102 to perform continuous sensing over large areas.

The length of waveguide 108 may be formed in various configurations. For example, the length of waveguide 108 may be configured as a parallel-conductor waveguide (e.g., as in FIG. 3A). By way of another example, the length of waveguide 108 may be configured as a single conductor plate waveguide (e.g., as in FIG. 3B). It should be noted that different configurations of the length of waveguide 108 may result in different sensing capabilities. For example, some configurations (e.g., a parallel conductor waveguide) may only be suitable for sensing touch events. By way of another example, other configurations (e.g., a single conductor plate waveguide) may be suitable for detecting touch events, proximity, and/or gesture.

In embodiments, the system 100a includes one or more matching circuits 110. The one or more matching circuits 110 may be located at one or more of the first port 104 and/or the second port 106. For example, the matching circuits 110 may be any circuit configured to alter impedance. The matching circuits 110 may be configured to adjust input and/or output impedance of the electromagnetic transmission line sensor 102. For example, impedance may be adjusted to maximize the power transmission efficiency of the system 100a or heighten or reduce the sensitivity of the system 100a.

In embodiments, the system 100a includes a transmitter 112 coupled to one of the first port 104 or the second port 106. The transmitter 112 may be coupled to the first port 104 or the second port 106 via one or more intervening components (e.g., a matching circuit 110). The transmitter 112 may be configured to send packets (e.g., bursts of waves operating as a unit) through the electromagnetic transmission line sensor 102. The packets may include various types of waves, including, but not limited to, guided waves. For example, the guided waves may include surface waves, interface waves, quasi-guided waves, or the like.

It should be noted that different types of waves transmitted by the transmitter 112 may be able to sense different events. For example, a surface wave may be used for touch, proximity, and/or gesture sensing. By way of another example, an interface wave may be used for touch sensing but not proximity sensing and gesture sensing. Interface waves may also possess a high signal to noise ratio (SNR) and low loss compared to a surface wave.

In embodiments, the system 100a includes a receiver 114 coupled to one of the first port 104 or the second port 106. The receiver 114 may be coupled to the first port 104 or the second port 106 (e.g., the one of the first port 104 or the second port 106 that the transmitter is not coupled to) via one or more intervening components (e.g., a matching circuit 110).

In embodiments, the transmitter 112 transmits a packet through the electromagnetic transmission line sensor 102. The packet may then be received by the receiver 114. The receiver 114 may include processing elements (not shown), which may be used to process the received packet and determine information based on the received packet. The receiver 114 may possess information about what an unaffected packet should look like, and thus be able to compare a received packet to an unaffected packet to determine things such as, but not limited to, touch events, proximity, gesture, and/or a change in sensing parameter.

FIG. 1B is a block diagram illustrating a system 100b including an electromagnetic transmission line sensor 102, in accordance with one or more embodiments of the present disclosure.

In embodiments, the system 100b includes an electromagnetic transmission line sensor 102. The electromagnetic transmission line sensor 102 may include a first port 104, a second port 106, and a length of wave guide 108 disposed between the first port 104 and the second port 106. The electromagnetic transmission line sensor 102 may be configured such that it is wireless and continuous. Thus, the electromagnetic transmission line sensor 102 may not be powered directly. Further, the continuous nature of the electromagnetic transmission line sensor 102 may provide superior sensing capabilities over discrete sensors, as there are no gaps between sensing locations.

In embodiments, the electromagnetic transmission line sensor 102 includes a first port 104. The first port 104 may be located at an end of the electromagnetic transmission line sensor 102 (e.g., an end of the length of waveguide 108). The first port 104 may be configured to couple one or more peripheral devices (e.g., sensors, circuits, other electronics, or the like) to the electromagnetic transmission line sensor 102. Further, the first port 104 may be free or grounded.

In embodiments, the electromagnetic transmission line sensor 102 includes a second port 106. The second port 106 may be located at an end of the electromagnetic transmission line sensor 102 (e.g., an end of the length of waveguide 108). The second port 106 may be configured to couple one or more peripheral devices (e.g., sensors, circuits, other electronics, or the like) to the electromagnetic transmission line sensor 102. Further, the second port 106 may be free or grounded.

In embodiments, the electromagnetic transmission line sensor 102 includes a length of waveguide 108. The length of waveguide 108 may be flexible (e.g., making the electromagnetic transmission line sensor 102 flexible). This may allow the electromagnetic transmission line sensor 102 to be embedded into various utility structures (e.g., seats, bathroom fixtures, kitchen fixtures, or the like) and/or into other structures (e.g., walls, floors, tiles, frames, ceilings or the like). Further, the length of waveguide 108 may be of any length, thus allowing the electromagnetic transmission line sensor 102 to perform continuous sensing over large areas.

Figure 3B:
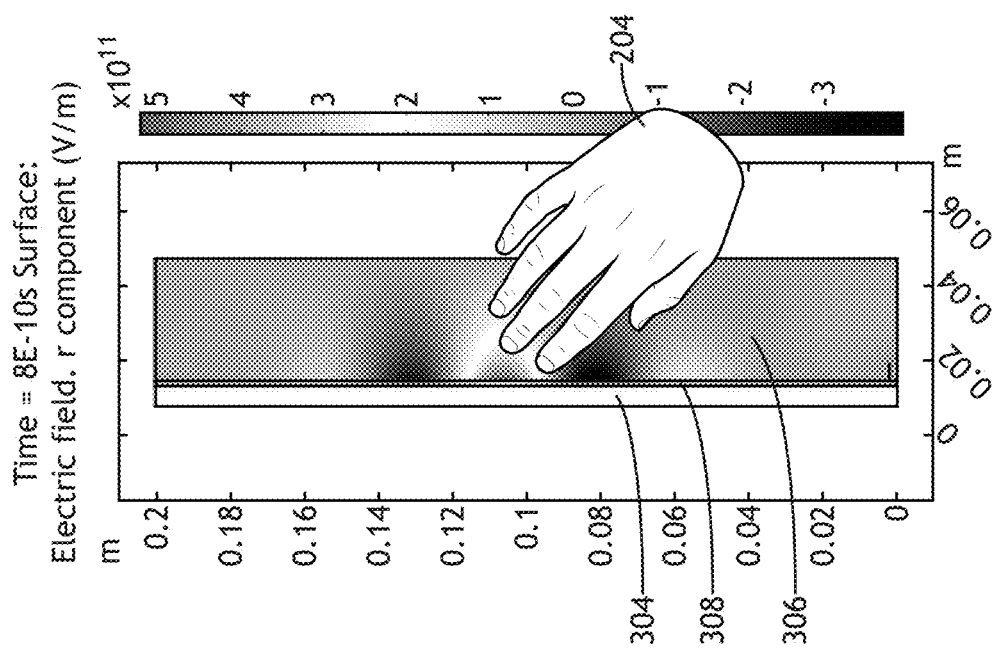
FIG. 3B shows an example proximity event detection with a single conductor plate waveguide using surface wave obstruction caused by the object in proximity, in accordance with one or more embodiments of the present disclosure.
Figure 3A:
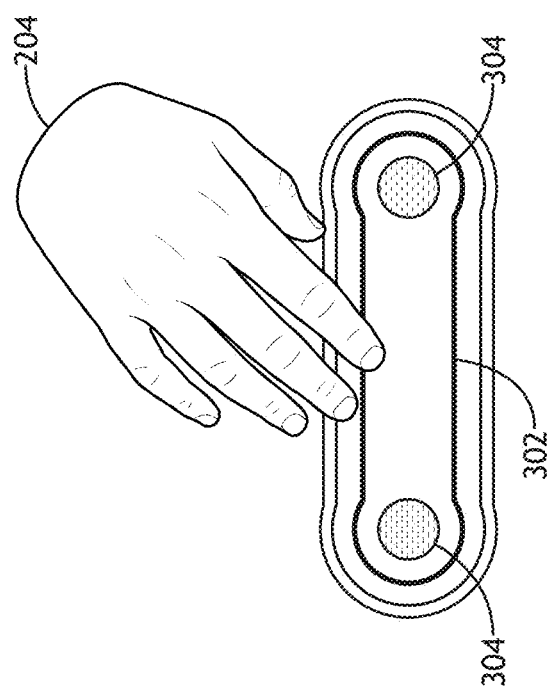
FIG. 3A shows an example touch event detection with a parallel-conductor waveguide using interface wave obstruction caused by touching, in accordance with one or more embodiments of the present disclosure.

The length of waveguide 108 may be formed in various configurations. For example, the length of waveguide 108 may be configured as a parallel-conductor waveguide (e.g., as in FIG. 3A, showing the cross section). By way of another example, the length of waveguide 108 may be configured as a single conductor plate waveguide (e.g., as in FIG. 3B, showing a section from the side). It should be noted that different configurations of the length of waveguide 108 may result in different sensing capabilities. For example, some configurations (e.g., a parallel conductor waveguide) may only be suitable for sensing touch events. By way of another example, other configurations (e.g., a single conductor plate waveguide) may be suitable for detecting touch events, proximity, and/or gesture.

In embodiments, the system 100b includes one or more matching circuits 110. The one or more matching circuits 110 may be located at one or more of the first port 104 and/or the second port 106. For example, the matching circuits 110 may be any circuit configured to alter impedance. The matching circuits 110 may be configured to adjust input and/or output impedance of the electromagnetic transmission line sensor 102. For example, impedance may be adjusted to maximize the efficiency of the system 100b or heighten or reduce the sensitivity of the system 100b.

In embodiments, the system 100b includes an interrogator 116. The interrogator 116 may be configured as a time domain reflectometer (TDR) (e.g., a device that measures reflections along a conductor). The interrogator 116 may have properties of transmitters (e.g., sending signals) and receivers (e.g., receiving the reflected signals) (e.g., pulse-echo capabilities).

The interrogator 116 may be coupled with one of the first port 104 or the second port 106. Further, there may be one or more intermediate components (e.g., a matching circuit 110) when coupling the interrogator 116 to one of the first port 104 or the second port 106.

For example, the interrogator 116 may send a packet through the electromagnetic transmission line sensor 102. The packet may be reflected at certain points along the electromagnetic transmission line sensor 102 (e.g., reflected at the second port 106 when the interrogator 116 is located at the first port 104). The interrogator 116 may use the reflected packet to determine information about events along the electromagnetic transmission line sensor 102. For example, an amplitude of the reflected packet may allow the interrogator 116 to determine impedance. Further, the time between sending the packet and receiving the reflected packet may allow the interrogator 116 to determine a distance.

Figure 1C:
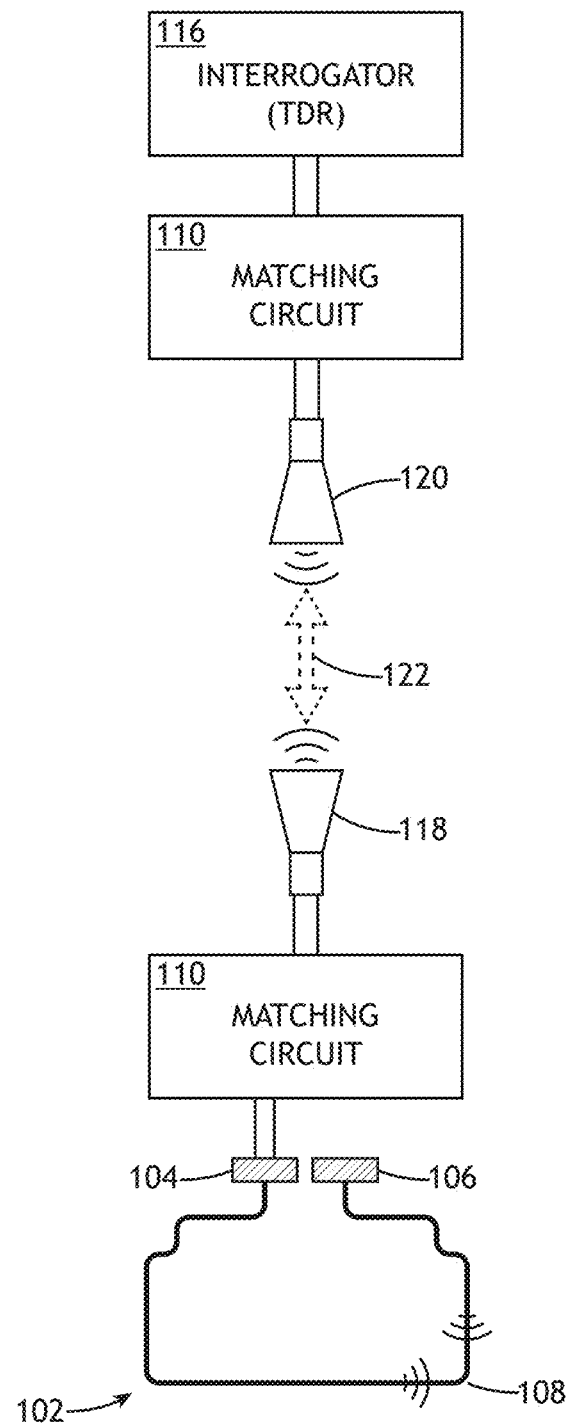
FIG. 1C is a block diagram illustrating a system including an electromagnetic transmission line sensor, in accordance with one or more embodiments of the present disclosure.

FIG. 1C is a block diagram illustrating a system 100c including an electromagnetic transmission line sensor 102, in accordance with one or more embodiments of the present disclosure.

In embodiments, the system 100c includes an electromagnetic transmission line sensor 102. The electromagnetic transmission line sensor 102 may include a first port 104, a second port 106, and a length of waveguide 108 disposed between the first port 104 and the second port 106. The electromagnetic transmission line sensor 102 may be configured such that it is wireless and continuous. Thus, the electromagnetic transmission line sensor 102 may not be powered directly. Further, the continuous nature of the electromagnetic transmission line sensor 102 may provide superior sensing capabilities over discrete sensors, as there are no gaps between sensing locations.

In embodiments, the electromagnetic transmission line sensor 102 includes a first port 104. The first port 104 may be located at an end of the electromagnetic transmission line sensor 102 (e.g., an end of the length of waveguide 108). The first port 104 may be configured to couple one or more peripheral devices (e.g., sensors, circuits, other electronics, or the like) to the electromagnetic transmission line sensor 102. Further, the first port 104 may be free or grounded.

In embodiments, the electromagnetic transmission line sensor 102 includes a second port 106. The second port 106 may be located at an end of the electromagnetic transmission line sensor 102 (e.g., an end of the length of waveguide 108). The second port 106 may be configured to couple one or more peripheral devices (e.g., sensors, circuits, other electronics, or the like) to the electromagnetic transmission line sensor 102. Further, the second port 106 may be free or grounded.

In embodiments, the electromagnetic transmission line sensor 102 includes a length of waveguide 108. The length of waveguide 108 may be flexible (e.g., making the electromagnetic transmission line sensor 102 flexible). This may allow the electromagnetic transmission line sensor 102 to be embedded into various utility structures (e.g., seats, bathroom fixtures, kitchen fixtures, or the like) and/or into other structures (e.g., walls, floors, tiles, ceilings, frames, or the like). Further, the length of waveguide 108 may be of any length, thus allowing the electromagnetic transmission line sensor 102 to perform continuous sensing over large areas.

The length of waveguide 108 may be formed in various configurations. For example, the length of waveguide 108 may be configured as a parallel-conductor waveguide (e.g., as in FIG. 3A showing cross sectional view). By way of another example, the length of waveguide 108 may be configured as a single conductor plate waveguide (e.g., as in FIG. 3B showing the side view). It should be noted that different configurations of the length of waveguide 108 may result in different sensing capabilities. For example, some configurations (e.g., a parallel conductor waveguide) may only be suitable for sensing touch events. By way of another example, other configurations (e.g., a single conductor plate waveguide) may be suitable for detecting touch events, proximity, and/or gesture.

In embodiments, the system 100c includes one or more matching circuits 110. The one or more matching circuits 110 may be located at one or more of the first port 104 and/or the second port 106. For example, the matching circuits 110 may be any circuit configured to alter impedance. The matching circuits 110 may be configured to adjust input and/or output impedance of the electromagnetic transmission line sensor 102. For example, impedance may be adjusted to maximize the efficiency of the system 100c or heighten or reduce the sensitivity of the system 100c.

In embodiments, the system 100c includes an interrogator 116. The interrogator 116 may be configured as a time domain reflectometer (TDR) (e.g., a device that measures reflections in electric wave guides). The interrogator 116 may have properties of transmitters (e.g., sending signals) and receivers (e.g., receiving the reflected signals) (e.g., pulse-echo capabilities).

In embodiments, the interrogator 116 may be located at a distance from the electromagnetic transmission line sensor 102.

In embodiments, the system 100c includes a passive antenna 118. The passive antenna 118 may be coupled to one of the first port 104 or the second port 106. Further, there may be one or more intermediate components (e.g., a matching circuit 110) when coupling the passive antenna 118 to one of the first port 104 or the second port 106. However, the passive antenna 118 powered by received packets itself may not be connected to any external power source, and solely receive packets and retransmit reflections of those received packets (e.g., without incorporating additional power).

In embodiments, the system 100c includes an active antenna 120. The active antenna 120 may be coupled to the interrogator 116 (e.g., the active antenna 120 and the interrogator 116 may both be located at a distance from the electromagnetic transmission line sensor 102). Further, there may be one or more intermediate components (e.g., a matching circuit 110) when coupling the active antenna 120 to the interrogator 116. The active antenna 120 may be configured to transmit a packet (e.g., a packet from the interrogator 116) to the passive antenna 118. The packet may be received from the interrogator 116 via the passive antenna 118 and pass through the electromagnetic transmission line sensor 102. Once reflected, the reflected packet may be transmitted from the passive antenna 118 to the active antenna 120, and subsequently interpreted by the interrogator.

In embodiments, the system 100c includes a wireless interrogation link 122. The wireless interrogation link may broadly be considered the air link between the active antenna 120 and the passive antenna 118 used to pass packets between the active antenna 120 and the passive antenna 118.

For example, the interrogator 116 may send a packet through the electromagnetic transmission line sensor 102. The packet may be reflected at certain points along the electromagnetic transmission line sensor 102 (e.g., reflected at the second port 106 when the interrogator 116 is located at the first port 104). The interrogator 116 may use the reflected packet to determine information about events along the electromagnetic transmission line sensor 102. For example, an amplitude of the reflected packet may allow the interrogator 116 to determine impedance. Further, the time between sending the packet and receiving the reflected packet may allow the interrogator 116 to determine a distance.

Figure 2B:
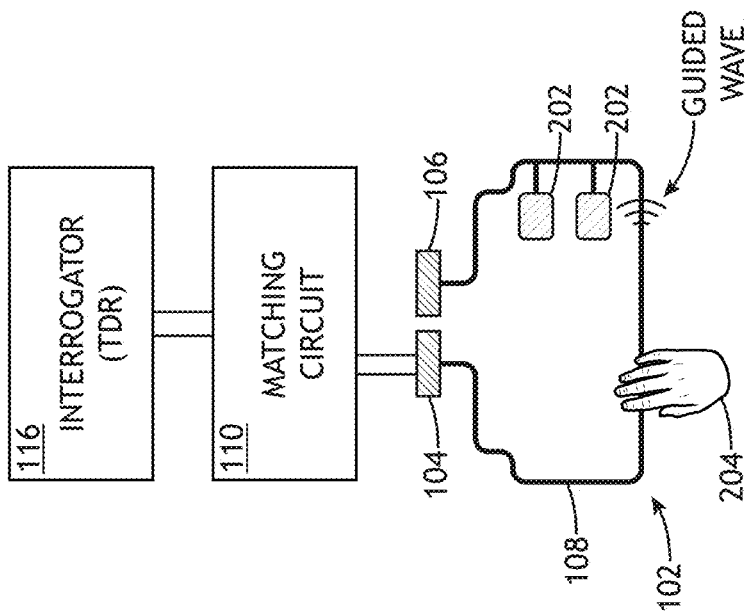
FIG. 2B is a block diagram illustrating a system including an electromagnetic transmission line sensor, as well as auxiliary sensors and objects, in accordance with one or more embodiments of the present disclosure.
Figure 2A:
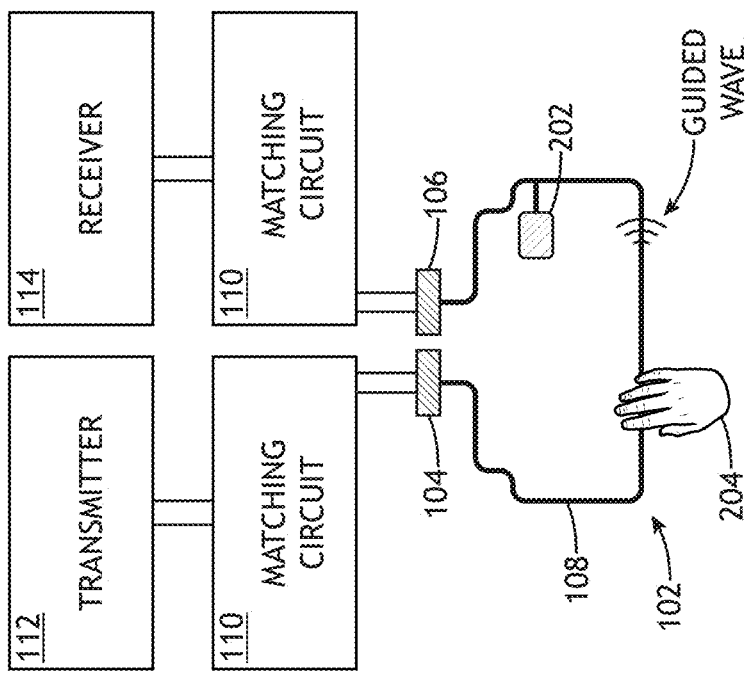
FIG. 2A is a block diagram illustrating a system including an electromagnetic transmission line sensor, as well as auxiliary sensors and objects, in accordance with one or more embodiments of the present disclosure.

FIG. 2A is a block diagram illustrating a system 100a including an electromagnetic transmission line sensor 102, as well as auxiliary sensors 202 (e.g., temperature, pressure, strain, humidity, identification tags etc.,) and objects 204, in accordance with one or more embodiments of the present disclosure. For example, the system 100a shown in FIG. 2A may correspond to the system 100a in FIG. 1A.

In embodiments, one or more auxiliary sensors 202 may be incorporated into the system 100a. For example, the auxiliary sensors 202 may include, but are not limited to, one or more temperature sensors, one or more humidity sensors, one or more stress sensors, one or more strain sensors, and/or one or more pressure sensors. The auxiliary sensors 202 may be coupled to the length of waveguide 108 and/or one or more of the first port 104 or the second port 106. In this way, when a packet (e.g., a packet transmitted by the transmitter 112) passes through the electromagnetic transmission line sensor 102, the packet received at the receiver 114 may be altered (e.g., the amplitude and/or the phase of the packet may be altered). Thus, the alteration to the packet may provide information associated with the one or more auxiliary sensors 202.

In embodiments, the system 100a detects one or more objects 204 (e.g., bodies, body parts, objects, or the like). For example, the packet transmitted by the transmitter 112 may pass through one or more objects 204 and ultimately be received by the receiver 114. The packet passing through an object 204 may alter the amplitude and/or the phase of the packet. Thus, the receiver 114 may receive a packet with a different amplitude and/or phase than a packet that had not passed through an object 204. Thus, the packet that passed through an object 204 may have its amplitude and/or phase analyzed (e.g., by processing elements in the receiver 114) to determine information about the object 204, such as proximity or touch.

FIG. 2B is a block diagram illustrating a system 100b including an electromagnetic transmission line sensor 102, as well as auxiliary sensors 202 and objects 204, in accordance with one or more embodiments of the present disclosure. For example, the system 100b shown in FIG. 2B may correspond to the system 100b in FIG. 1B.

In embodiments, one or more auxiliary sensors 202 may be incorporated into the system 100b. For example, the auxiliary sensors 202 may include, but are not limited to, one or more temperature sensors, one or more humidity sensors, one or more stress sensors, one or more strain sensors, and/or one or more pressure sensors. The auxiliary sensors 202 may be coupled to the length of waveguide 108 and/or one or more of the first port 104 or the second port 106. The interrogator 116 may transmit a packet through the electromagnetic transmission line sensor 102, where one or more auxiliary sensors 202 are coupled. For each auxiliary sensor 202, a reflection of the launched packet may occur. The reflection of the launched packet may be received by the interrogator 116. The interrogator 116 may then perform time domain reflectometry such that information relating to the auxiliary sensors 202 may be determined by the interrogator 116.

In embodiments, the system 100b detects one or more objects 204 (e.g., bodies, body parts, objects, or the like). For example, the packet transmitted by the interrogator 116 may encounter one or more objects 204. For each object 204, the packet may be reflected back to the interrogator 116. The reflected packets may have different amplitudes than the launched packets. Thus, the packet reflected by an object 204 may have its amplitude and/or time of arrival analyzed (e.g., by the interrogator 116) to determine information about the object 204, such as the proximity using amplitude and the location of the object 204 using the time of arrival. In a similar way, sensing information from discrete sensors 202 may be determined using the change in amplitude corresponding to their reflected packets arriving at their time of arrival based on their known location along the continuous sensor.

Figure 2C:
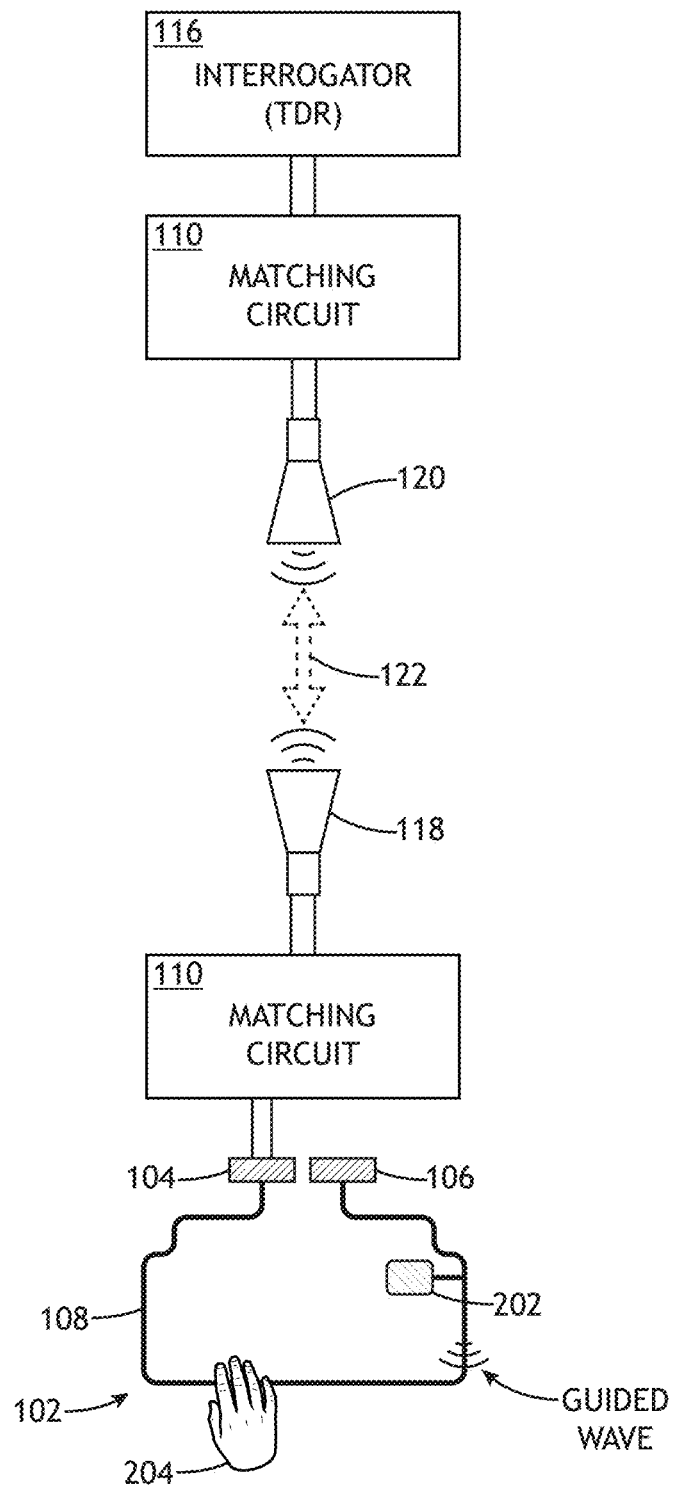
FIG. 2C is a block diagram illustrating a system including an electromagnetic transmission line sensor, as well as auxiliary sensors and objects, in accordance with one or more embodiments of the present disclosure.

FIG. 2C is a block diagram illustrating a system 100c including an electromagnetic transmission line sensor 102, as well as auxiliary sensors 202 and objects 204, in accordance with one or more embodiments of the present disclosure. For example, the system 100c shown in FIG. 2C may correspond to the system 100c in FIG. 1C.

In embodiments, one or more auxiliary sensors 202 may be incorporated into the system 100c. For example, the auxiliary sensors 202 may include, but are not limited to, one or more temperature sensors, one or more humidity sensors, one or more stress sensors, one or more strain sensors, and/or one or more pressure sensors. The auxiliary sensors 202 may be coupled to the length of waveguide 108 and/or one or more of the first port 104 or the second port 106.

In embodiments, one or more auxiliary sensors 202 may be incorporated into the system 100c. For example, the auxiliary sensors 202 may include, but are not limited to, one or more temperature sensors, one or more humidity sensors, one or more stress sensors, one or more strain sensors, and/or one or more pressure sensors. The auxiliary sensors 202 may be coupled to the length of waveguide 108 and/or one or more of the first port 104 or the second port 106. The interrogator 116 may transmit a packet from the active antenna 120 to the passive antenna 118 (e.g., via the wireless interrogation link 122). The packet may then pass through the electromagnetic transmission line sensor 102, where one or more auxiliary sensors 202 are coupled. For each auxiliary sensor 202, a reflection of the launched packet may occur. The reflection of the launched packet may be transmitted by the passive antenna 118 to the active antenna 120 (e.g., via the wireless transmission link 122) and received by the interrogator 116. The interrogator 116 may then perform time domain reflectometry such that information relating to the auxiliary sensors 202 may be determined by the interrogator 116.

In embodiments, the system 100c detects one or more objects 204 (e.g., bodies, body parts, objects, or the like). For example, the packet transmitted by the interrogator 116 (e.g., via sending the packet from the active antenna 120 to the passive antenna 118 via the wireless interrogation link 122) may encounter one or more objects 204 while propagating through the transmission line sensor 102. For each object 204, the packet may be reflected back to the interrogator 116 (e.g., from the passive antenna 118 to the active antenna 120 via the wireless interrogation link 122). The reflected packets may have different amplitudes than the launched packets. Thus, the packet reflected by an object 204 may have its amplitude and/or time of arrival analyzed (e.g., by the interrogator 116) to determine information about the object 204, such as a proximity using amplitude and location of the object 204 using time of arrival. In a similar way, sensing information from discrete sensors 202 may be determined using the change in amplitude corresponding to their reflected packets arriving at their time of arrival based on their known location along the continuous sensor.

Broadly referring to the systems 100a,b,c described in FIGS. 2A-2C, issues such as impedance mismatch due to various components within the systems 100a,b,c (e.g., auxiliary sensors 202, active antennas 120 and passive antennas 118, or the like) may be mitigated via techniques including, but not limited to, impedance matching, bassline signal subtraction, amplifiers and the like.

The design parameters of the electromagnetic transmission line sensor 102 may be optimized using transmission line theory, in light of the parameters that need to be sensed for a particular application of the system 100. For example, changes in impedance may occur due to objects 204 coming in proximity to the systems 100*a,b,c* or a change in sensing parameters of the connected discrete sensors 202.

The reflection coefficient may be given by given by $$\Gamma = \frac{Z_C - Z_A}{Z_C + Z_A},$$

where $Z_C$ is the characteristic impedance of the transmission line and $Z_A$ is the impedance of the transmission line with changed impedance. When $Z_C=Z_A$, then no reflection will occur, and the reflection coefficient will equal zero. Further, the reflection coefficient may be proportional to changes in $Z_A$, with $Z_A$, being proportional to the proximity of an object 204 or the change in sensing parameter of the auxiliary sensors 202.

Multiple changes along the electromagnetic transmission line sensor 102 may cause multiple reflections of the launched packet. For example, this may help the system 100*a* detect the object. By way of another example, this may help systems 100*b* and 100*c* estimate the number of objects and their proximity to the electromagnetic transmission line sensor 102 or estimate the change in sensing parameters.

FIG. 3A shows an example touch event detection with a parallel-conductor waveguide (insulator 302 with conductor 304) using interface wave obstruction caused by touching, in accordance with one or more embodiments of the present disclosure.

In a parallel-conductor waveguide (insulator 302 with conductor 304), the electromagnetic field may be largely confined between the two conductors 304. This may mean that the electromagnetic field experiences very little spreading into the area surrounding the conductors 304 and insulator 302 especially when the distance between conductors is designed to be small. Thus, an object 204 may be seen in a touch event because a touch event will sufficiently alter the electromagnetic field such that a launched packet is altered when it is received for analysis. However, for proximity events, due to the lack of spreading of the electromagnetic field, changes in the electromagnetic field (e.g., changes in the electromagnetic field that would cause a change to a launched packet) may be negligible. Parallel-conductor waveguides are described in Y. Shibuya "Electromagnetic Waves in a Parallel-Plate Waveguide" (published December 2012), which is incorporated herein by reference in its entirety.

FIG. 3B shows an example proximity event detection with a single conductor plate wavefield 306 using surface wave obstruction caused by the object in proximity, in accordance with one or more embodiments of the present disclosure (insulator (308). FIG. 3B further illustrates the strength of the electromagnetic field being transmitted by the conductor coated with dielectric material 304 as distance from the conductor 304 increases.

With a single conductor plate wavefield 306, the electromagnetic field surrounds the conductor 304 (insulator 308). Thus, both touch and proximity may cause changes to the electromagnetic field with enough significance to alter packets. Further, touch events may reflect almost the entire packet, while proximity may reflect only a partial packet; therefore, touch and proximity may be distinguished. Additionally, degree of proximity (e.g., how close an object 204 is to the conductor) may be distinguished by the amount of reflection for the packet. Single conductor plate waveguides are described in Davide W. Greve, et. al, "Investigation of Goubau Wave Propagation on Large Pipes for Sensing Applications" (published May 23, 2023), which is incorporated herein by reference in its entirety.

Figure 4B:
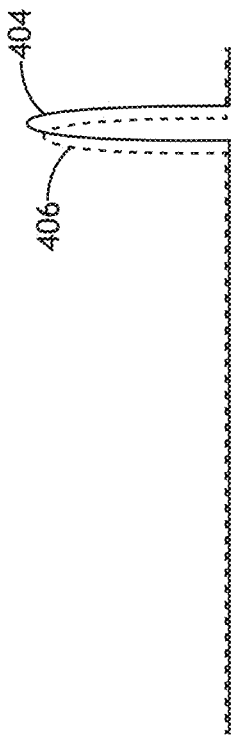
FIG. 4B is an example of a received unaffected packet and a received affected packet, in accordance with one or more embodiments of the present disclosure.
Figure 4A:
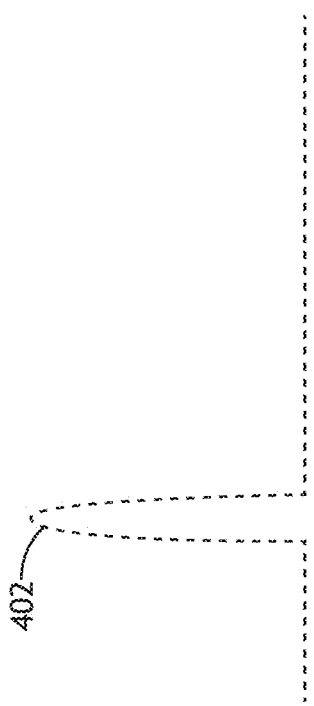
FIG. 4A is an example of a launched packet, in accordance with one or more embodiments of the present disclosure.

FIG. 4A is an example of a launched packet 402, in accordance with one or more embodiments of the present disclosure. For example, the launched packet of FIG. 4A may correspond to the system 100*a* depicted in FIGS. 1A and 2A. The launched packet 402 shown in FIG. 4A may represent clustered group of waves traveling together. The launched packet 402 may further take the form of any electromagnetic waves.

FIG. 4B is an example of a received unaffected packet 404 and a received affected packet 406, in accordance with one or more embodiments of the present disclosure. For example, the received unaffected packet 404 and the received affected packet 406 of FIG. 4B may correspond to the system 100*a* depicted in FIGS. 1A and 2A.

For example, the received unaffected packet 404 may pass through the electromagnetic transmission line sensor 102 with no impedance changes on its path (e.g., due to auxiliary sensors 202 and objects 204 with perfect impedance matching). Conversely, the received affected packet 406 may have had one or more impedance changes when passing through the electromagnetic transmission line sensor 102 (e.g., due to change in sensing parameter of one or more auxiliary sensors 202 and/or one or more objects 204 coming in proximity or touching). Further, because of one or more impedances affecting the received affected packet 406 and no impedances affecting the received unaffected packet 404, there may be an amplitude difference and/or phase shift between the two.

Figure 5B:
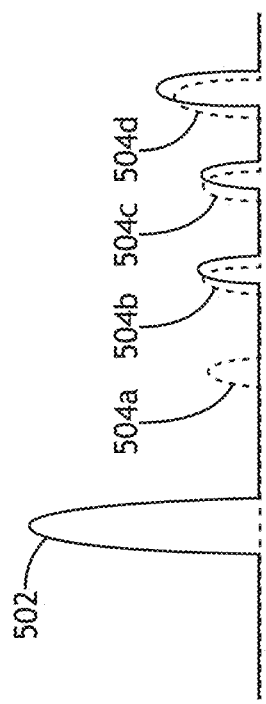
FIG. 5B is an example of various received packets, in accordance with one or more embodiments of the present disclosure.
Figure 5A:
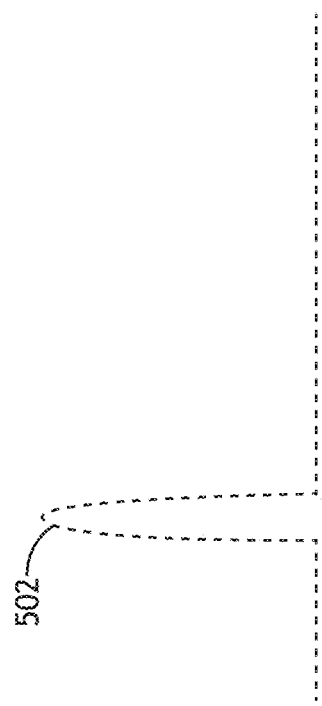
FIG. 5A is an example of a launched packet, in accordance with one or more embodiments of the present disclosure.

FIG. 5A is an example of a launched packet, in accordance with one or more embodiments of the present disclosure. For example, the launched packet of FIG. 5A may correspond to the system 100*b, c* depicted in FIGS. 1B-1C and 2B-2C. The launched packet 502 shown in FIG. 5A may represent clustered group of waves traveling together (broadband impulse). The launched packet 502 may further take the form of any electromagnetic waves.

FIG. 5B is an example of various reflected packets 504*a-d*, in accordance with one or more embodiments of the present disclosure. For example, the various reflected packets 504*a-d* of FIG. 5B may correspond to the systems 100*b,c* depicted in FIGS. 1B-1C and 2B-2C.

In FIG. 5B, the set of reflected packets 504*a-d* may each correspond to different changes in impedance (e.g., the different changes of impedance shown in FIGS. 2B and 2C). For example, reflected packet 504*a* may correspond to reflection due to an object 204, reflected packet 504*b* and reflected packet 504*c* may correspond to reflection due to auxiliary sensors 202, and reflected packet 504*d* may correspond to reflection due to the launched packet 502 (502 packet shown in FIG. 5B is the launched packet appearing in the interrogator received signal as incident packet) being reflected at the second port 106. The interrogator 116 may use the reflected packets 504*a-d* (e.g., differences in amplitude of the reflected packets 504*a-d* and/or differences in time of arrival of the reflected packets 504*a-d*) to determine information about objects 204 and/or the auxiliary sensors.

Figure 6B:
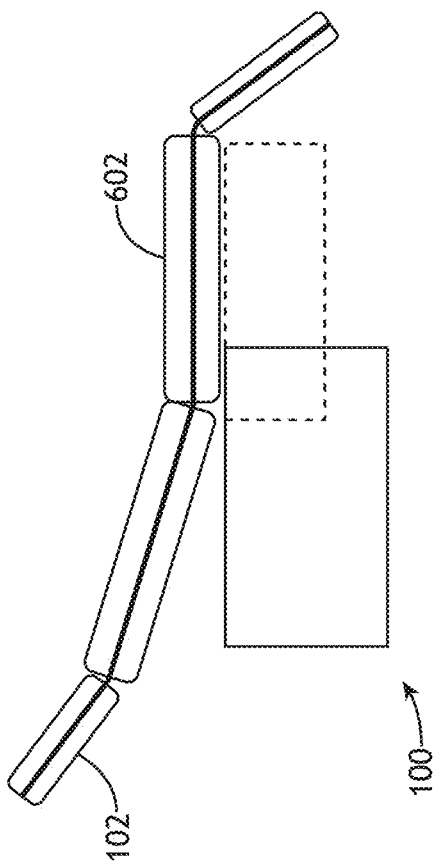
FIG. 6B is a side view of the system integrated into a passenger seat, in accordance with one or more embodiments of the present disclosure.
Figure 6A:
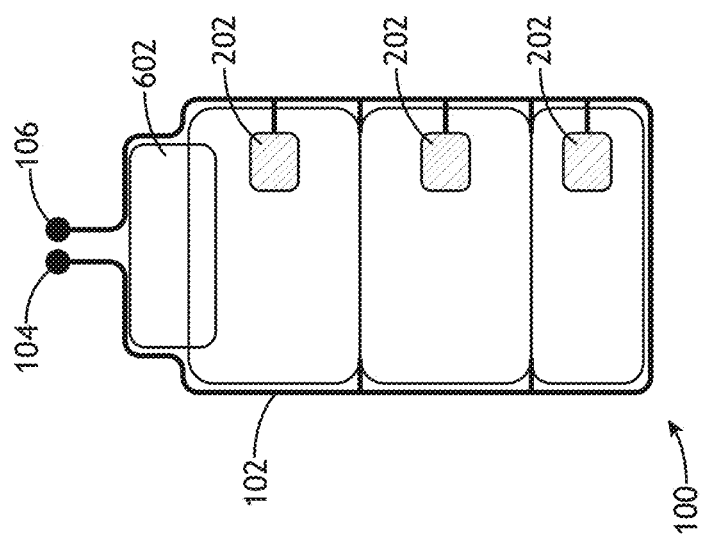
FIG. 6A is a top view of the system integrated into a passenger seat as an example, in accordance with one or more embodiments of the present disclosure.

FIG. 6A is a top view of the system 100 integrated into a passenger seat 602, in accordance with one or more embodiments of the present disclosure. FIG. 6B is a side view of the system 100 integrated into a passenger seat, in accordance with one or more embodiments of the present disclosure. The system 100 may correspond to any of the systems 100*a,b,c* shown in FIGS. 1A-1C.

For example, the system 100 may be flexible (e.g., the electromagnetic transmission line sensor 102 may be flexible) such that some, or all, of the system 100 may be embedded into a seat 602. Further, the system 100 may be able to accommodate the seat 602 being in any number of positions (e.g., a sitting position, a slouched or reclined position, and/or a berthed or horizontal position).

Each seat 602 may additionally include one or more auxiliary sensors 202 embedded in the seat 602 and connected to the electromagnetic transmission line sensor 102. For example, the auxiliary sensors 202 may be configured to determine things such as, but not limited to, the heartrate of a passenger or whether or not a seat 602 is occupied.

FIG. 7A is a side view of the system 100 detecting an object while reclining the footrest of a seat 602, in accordance with one or more embodiments of the present disclosure. The system 100 may correspond to any of the systems 100a,b,c shown in FIGS. 1A-1C.

For example, FIG. 7A demonstrates a seat 602 equipped with the system 100 detecting proximity of an object 204 when moving the seat forward or adjusting the foot rest. FIG. 7B is a side view of the system 100 detecting an object 204 while reclining the backrest of a seat 602, in accordance with one or more embodiments of the present disclosure. Upon detection of proximity (e.g., within a certain threshold) (FIG. 7A) or a touch event (FIG. 7B), the system 100 may cause the seat 602 restrict its movement to avoid making contact with the object 204 (e.g., restricting movement that would cause contact with the object 204 or preventing any movement of the seat 602).

The placement of the system 100 around edges of seats 602 in vehicles (e.g., in aircraft or automobiles) may prevent injury to users when adjusting the seat 602. Further, the system 100 may detect other objects 204 that may damage the seat 602 as the seat is adjusted. Further, because embodiments of the system 100 may include a localizing ability, lost objects may be found with greater ease.

Figure 8B:
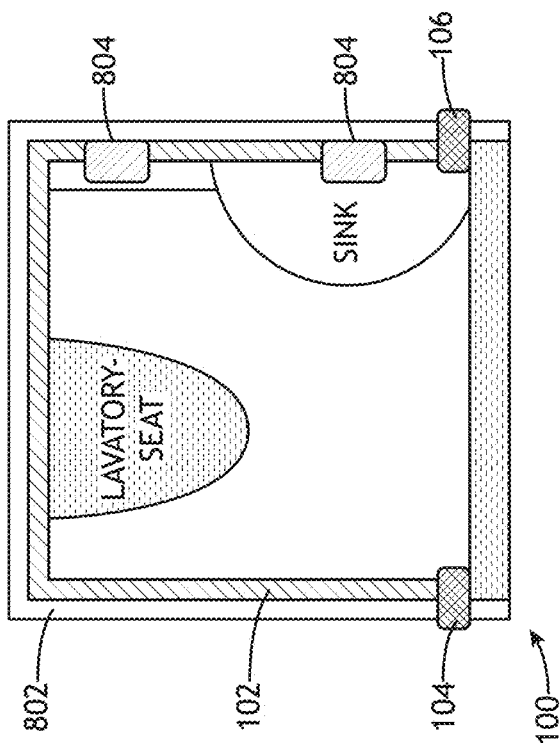
FIG. 8B is a top view of the system deployed in a lavatory, in accordance with one or more embodiments of the present disclosure.
Figure 8A:
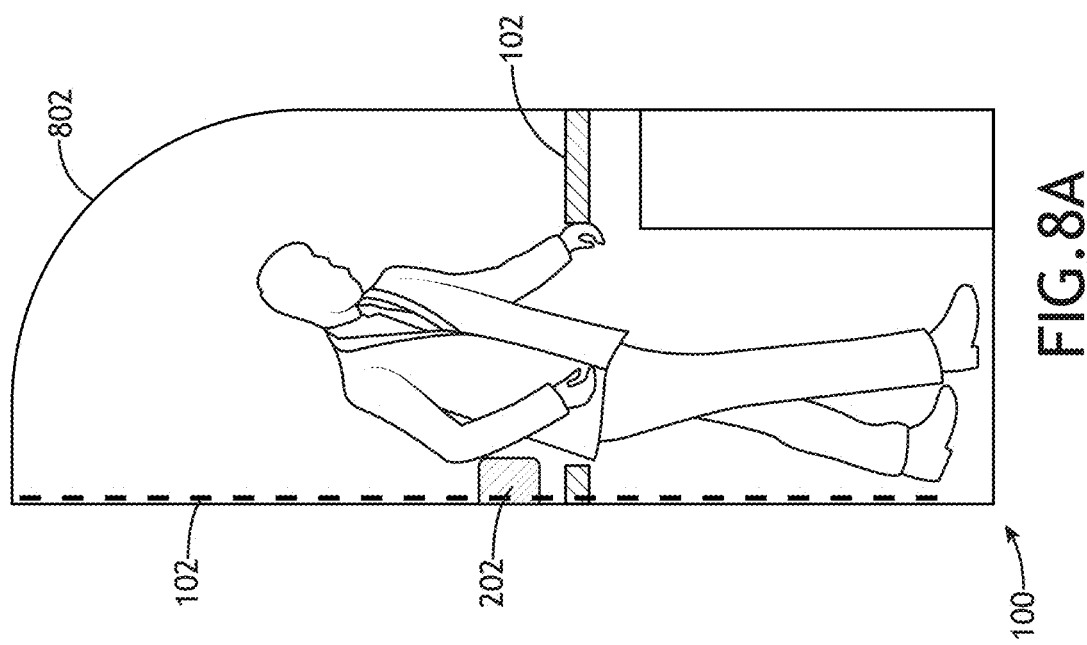
FIG. 8A is a side view of the system deployed in a lavatory, in accordance with one or more embodiments of the present disclosure.

FIG. 8A is a side view of the system 100 deployed in a lavatory 802, in accordance with one or more embodiments of the present disclosure. FIG. 8B is a top view of the system 100 deployed in a lavatory 802, in accordance with one or more embodiments of the present disclosure. The system 100 may correspond to any of the systems 100a,b,c shown in FIGS. 1A-1C.

For example, the electromagnetic transmission line sensor 102 may be embedded into the wall of the lavatory 802 (e.g., either vertically or horizontally). Further, there may be one or more auxiliary sensors 202 (e.g., auxiliary temperature sensors, auxiliary humidity sensors, or the like) coupled to the electromagnetic transmission line sensor 102 located at various locations in the lavatory. The electromagnetic transmission line sensor 102 and system 100 may be configured to measure touch events, proximity, and/or gestures at any number of selected locations in the lavatory 802. In this way, the system 100 may be used to determine things including, but not limited to, human presence in the lavatory 802, whether the human is in a standing position, a sitting position, or a fallen down position, and what the human is currently using the lavatory for. In this way, proximity in generally may be used to determine a presence in the lavatory 802, while relative proximity may be used to determine a position and/or state of the human within the lavatory 802.

In embodiments, the system 100 may include one or more gesture locations 804. For example, a gesture location 804 may be a particular point along the electromagnetic transmission line sensor 102 configured to determine a gesture. A gesture location 804 may also be a particular location of interest where gesture information may be useful. For example, in the case of a lavatory 802, a gesture location 804 may be locations such as, but not limited to, a faucet, a soap dispenser, a toilet lid, or the like.

While various use cases for the system 100 have been discussed above and illustrated in FIGS. 6A-8B, those uses should be viewed as illustrative only and not viewed as limiting on the present disclosure. Additional, nonlimiting uses, though not illustrated in the accompanying figures, are discussed below.

The system 100 may be used to estimate human intent in various scenarios. The combination of proximity and gesture (e.g., the derivative of proximity) may provide indications of human intent. Human intent may be estimated in various locations, such as, but not limited to, seats 602, lavatories 802, automotive settings, fighter pilots in a cockpit, and the like. For example, the wireless electromagnetic transmission line sensor 102 may be oriented in a lavatory 802 such that the electromagnetic transmission line sensor 102 detects certain areas of actuation (e.g., trash flaps, faucet, toilet handle, various lids, soap dispensers, control panels, dashboards, steering assemblies, or the like). Using proximity and/or gestures detected by the electromagnetic transmission line sensor 102 and interpreted by the system 100, the intention of a user to actuate a particular device may be determined. Locations where sensing is not desired may be shielded appropriately.

The system 100 may also be used to count and/or measure objects and/or humans. For example, the electromagnetic transmission line sensor 102 may be oriented along a door frame (or embedded into a doorframe) such that it may count each individual as they pass through. Further, using proximity sensing, the system 100 may be able to determine a height of each individual that passes through. By way of another example, the system 100 may be used to count and measure bags to be loaded onto an aircraft. The electromagnetic transmission line sensor 102 may be embedded into an x-ray screening machine such that the system 100 may count each bag and take measurements of each bag as it passes through the x-ray screening machine.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system, comprising:
a transmitter;
a receiver, the receiver comprising one or more processing elements;
an electromagnetic transmission line sensor, configured to determine at least one of a presence of one or more objects or one or more additional sensing parameters, wherein the electromagnetic transmission line sensor is configured as a passive sensor, wherein the electromagnetic transmission line sensor is configured as a continuous sensor, wherein the electromagnetic transmission line sensor comprises:
a first port;
a second port, wherein one of the first port or the second port comprises the transmitter and another of the first port or the second port comprises the receiver; and
a length of waveguide disposed between the first port and the second port, wherein the length of waveguide is suitable for transmitting an electromagnetic wave, wherein the length of waveguide is configured to couple to one or more auxiliary sensors, wherein the transmitter transmits a packet comprising the electromagnetic wave through the length of waveguide to the receiver, wherein the one or more processing elements of the receiver interprets the packet to determine the presence of at least one of: a touch event with the one or more objects, a proximity of the one or more objects, a gesture of the one or more objects, or the one or more additional sensing parameters; and
one or more matching circuits, configured to alter an impedance, wherein the one or more matching circuits are located at one or more of the first port and the second port, wherein one or more of the transmitter or the receiver are coupled to the one or more of the first port and the second port via the one or more matching circuits.

2. The system of claim 1, wherein the electromagnetic wave is a surface electromagnetic wave.

3. The system of claim 1, wherein the length of waveguide is configured as one of a parallel-conductor waveguide or a single-conductor plate waveguide.

4. A system, comprising:
an interrogator, the interrogator configured to transmit a launched packet comprising an electromagnetic wave and receive one or more reflected packets corresponding to the launched packet; and
an electromagnetic transmission line sensor, configured to determine at least one of a presence of one or more objects or one or more additional sensing parameters, wherein the electromagnetic transmission line sensor is configured as a passive sensor, wherein the electromagnetic transmission line sensor is configured as a continuous sensor, wherein the electromagnetic transmission line sensor comprises:
a first port;
a second port, wherein one of the first port or the second port comprises a connection to the interrogator; and
a length of waveguide disposed between the first port and the second port, wherein the length of waveguide is suitable for transmitting the electromagnetic wave, wherein the length of waveguide is configured to couple to one or more auxiliary sensors, wherein the interrogator transmits a launched packet through the length of waveguide, wherein the one or more reflected packets are caused by a corresponding one or more of one or more objects, the one or more auxiliary sensors, or another of the first port or the second port, wherein the interrogator interprets the packet to determine the presence of at least one of: a touch event with the one or more objects, a proximity of the one or more objects, a gesture of the one or more objects, a location of the one or more objects, or the one or more additional sensing parameters.

5. The system of claim 4, wherein the interrogator is located at a distance from the electromagnetic transmission line sensor.

6. The system of claim 5, wherein the interrogator transmits the launched packet and receives the one or more reflected packets corresponding to the launched packet via an active antenna coupled to the interrogator and a passive antenna coupled to the electromagnetic transmission line sensor via the one of the first port or the second port comprising the connection to the interrogator.

7. The system of claim 6, further comprising one or more matching circuits, configured to alter an impedance, wherein the one or more matching circuits are located at one or more of the one of the first port or the second port comprising the connection to the interrogator or the interrogator at the distance from the electromagnetic transmission line sensor.

8. The system of claim 4, wherein the interrogator is coupled to the one of the first port or the second port comprising the connection to the interrogator.

9. The system of claim 8, further comprising one or more matching circuits, configured to alter impedance, wherein the one or more matching circuits are located at the one of the first port or the second port comprising the connection to the interrogator, wherein the interrogator is coupled to the one of the first port or the second port comprising the connection to the interrogator via the matching circuit.

10. The system of claim 4, wherein the interrogator is a time domain reflectometer.

11. The system of claim 4, wherein another of the first port or the second port is at least one of: grounded, free, or coupled to at least one of the one or more auxiliary sensors.

12. The system of claim 4, wherein the electromagnetic wave is a surface electromagnetic wave.

13. The system of claim 4, wherein the length of waveguide is configured as one of a parallel-conductor waveguide or a single-conductor plate waveguide.

14. The system of claim 4, further comprising the one or more auxiliary sensors coupled to the electromagnetic transmission line sensor at discrete locations on the length of waveguide.

15. The system of claim 14, wherein the one or more auxiliary sensors comprises at least one of: one or more temperature sensors, one or more humidity sensors, one or more stress sensors, one or more strain sensors, or one or more pressure sensors.

16. A system, comprising:
a transmitter;
a receiver, the receiver comprising one or more processing elements;
an electromagnetic transmission line sensor, configured to determine at least one of a presence of one or more objects or one or more additional sensing parameters, wherein the electromagnetic transmission line sensor is configured as a passive sensor, wherein the electromagnetic transmission line sensor is configured as a continuous sensor, wherein the electromagnetic transmission line sensor comprises:

a first port;

a second port, wherein one of the first port or the second port comprises the transmitter and another of the first port or the second port comprises the receiver; and a length of waveguide disposed between the first port and the second port, wherein the length of waveguide is suitable for transmitting an electromagnetic wave, wherein the length of waveguide is configured to couple to one or more auxiliary sensors, wherein the transmitter transmits a packet comprising the electromagnetic wave through the length of waveguide to the receiver, wherein the one or more processing elements of the receiver interprets the packet to determine the presence of at least one of: a touch event with the one or more objects, a proximity of the one or more objects, a gesture of the one or more objects, or the one or more additional sensing parameters; and one or more auxiliary sensors coupled to the electromagnetic transmission line sensor at discrete locations on the length of waveguide via the one or more matching circuits.

17. The system of claim 16, wherein the one or more auxiliary sensors comprises at least one of: one or more temperature sensors, one or more humidity sensors, one or more stress sensors, one or more strain sensors, or one or more pressure sensors.

\* \* \* \* \*